Patented Oct. 5, 1948

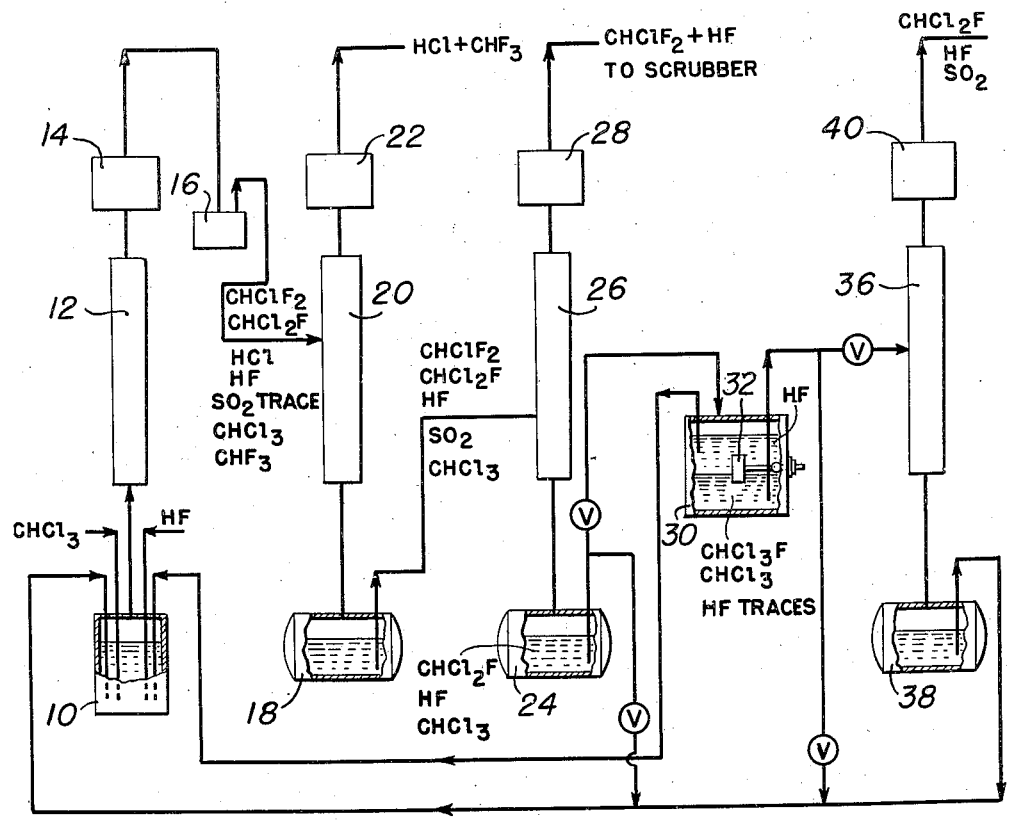

2,450,414

UNITED STATES PATENT OFFICE 2,450,414

DISTILLATION PROCESS FOR SEPARATING PRODUCTS OF CHLOROFORM FLUORINATION

Anthony F. Benning, Woodstown, N. J., assignor to Kinetic Chemicals, Inc., Wilmington, Del., a corporation of Delaware Application November 14, 1946, Serial No. 709,879

6 Claims. (Cl. 202—51)

This invention relates to a process for separating valuable components from the reaction mixture obtained in the fluorination of chloroform.

In the fluorination of chloroform in the presence of an antimony catalyst, there is produced a reaction mixture comprising mainly HCl, $CHClF_2$ and $CHCl_2F$ with small proportions of HF and usually small amounts of unreacted $CHCl_3$ and less than 0.5 mol per cent of $CHF_3$. The separation of the valuable components of such mixture has been attended with considerable difficulty. The usual procedure has been to wash the reaction mixture with water to remove the acidic components, drying and condensing the washed products and then subjecting to fractional distillation to remove the chlorodifluoromethane. During the reaction, only about 50% of the $CHCl_3$ is converted to $CHClF_2$ so that the reaction mixture contains about 56 mol per cent of HCl, about 18 mol per cent of $CHClF_2$, about 19 mol per cent of $CHCl_2F$ and smaller amounts of HF, $CHF_3$ and $CHCl_3$. This requires the use of large size equipment to wash, dry and condense the large amounts of $CHCl_2F$ and other organic products in the reaction mixture. Also, very substantial amounts of valuable organic products are lost by solution in the wash water. This procedure further involves the loss of valuable HCl in the form of an aqueous solution contaminated with HF and organic products. Furthermore, when it was attempted to fractionally distill the reaction mixture, it was found that the distillation characteristics of the various components varied so much and were so inconsistent that, prior to my invention, it was not possible to carry out an efficient and economical separation.

It is an object of the present invention to provide a process for recovering the valuable components from a reaction mixture obtained by fluorinating chloroform. Another object is to provide a process for separating monochlorodifluoromethane from the reaction mixture obtained by fluorinating $CHCl_3$. A further object is to provide a process for recovering HCl in a usable form from the reaction mixture obtained by fluorinating $CHCl_3$. Other objects are to advance the art. Still other objects will appear hereinafter.

The above and other objects may be accomplished in accordance with my invention which comprises subjecting a reaction mixture, comprising mainly HCl, $CHClF_2$ and $CHCl_2F$ and small proportions of HF, to anhydrous fractional distillation under pressures of from about 40 to about 200 pounds per square inch gauge and at temperatures of from about −63° C. to about −20° C. adjusted to the pressures to distill off substantially pure anhydrous HCl while retaining the rest of the mixture in the still. The mixture, remaining in the still, may then be subjected to a further anhydrous fractional distillation under pressures of from about 0 to about 100 pounds per square inch gauge and at temperatures of from about −43° C. to about 20° C., adjusted to the pressures to distill off $CHClF_2$ and part of the HF from the rest of the mixture. The mixture of $CHClF_2$ and HF is then passed to a scrubber where it is washed with a small amount of water to remove the HF. The remainder of the reaction mixture may be recycled for further reaction but preferably is caused to settle until it forms a layer of organic products, containing dissolved HF, and a layer of substantially anhydrous HF, containing dissolved $CHCl_2F$, which layers are separated. The separated organic products may then be subjected to a further anhydrous distillation to separate the $CHCl_2F$ and dissolved HF from any unreacted $CHCl_3$. The $CHCl_3$ and the separated HF layer may then be recycled for further reaction.

I have found that, by such process, I am able to effectively separate the reaction mixture into its valuable components in an easy and economical manner and to largely overcome the objections of the method previously employed. Only relatively small amounts of material are subjected to the washing, drying and condensing steps, whereby large economies are effected in the process and in the apparatus employed. Furthermore, the HCl is recovered in a commercially valuable and usable form. There is also a substantially complete recovery of organic reactants since none is lost by solution in the scrubbing water. Furthermore, there is a substantial saving of HF by recycling the HF layer, since the HF therein is not lost by solution in the scrubbing water. It will thus be apparent that by my process, I am able to effectively recover the valuable components of the reaction mixture in a simple and easy manner and to effect large economies in the process and in the apparatus.

In order to more clearly illustrate my invention and the best modes of carrying the same into effect, my invention will be described in more detail with reference to the accompanying drawing which illustrates one form of apparatus, shown somewhat digrammatically, which may be employed for carrying out my invention.

The apparatus shown in Fig. 1 of the drawings comprises a reaction vessel 10, a reflux column 12, a dephlegmator 14, a brine cooled catch tank 16, a reflux column 20 and a dephlegmator 22, all connected in series by suitable conduits. A still pot 18 is connected to the bottom of the reflux column 20. There is also provided a reflux column 26, a dephlegmator 28 and a still pot 24 connected by suitable conduits. A conduit leads from the still pot 18 to the reflux column 26. The dephlegmator 28 is connected to a scrubber, not shown. The still pot is connected to the settling tank 30 through a suitable conduit. The still pot 24 may be provided with a conduit for withdrawing still residues therefrom and recycling them to the reaction vessel 10. The settling tank 30 is provided with a member 32 for indicating the level of interface between the two layers. A conduit is provided for withdrawing the HF layer from the settling tank 30 and recycling it to the reaction vessel 10. Another conduit is provided for drawing off the mixture of $CHCl_2F$ and $CHCl_3$ from the tank 30 and conducting it to a reflux column 36 provided with a dephlegmator 40 and a still pot 38. A conduit is provided for withdrawing $CHCl_3$ from the pot 38 and recycling it to the reaction vessel 10.

In operation, $CHCl_3$ and HF are passed to the reaction vessel 10, containing a fluorination catalyst, wherein the $CHCl_3$ is fluorinated to produce $CHClF_2$ and other products. A suitable catalyst may be prepared by placing a mixture of about 400 parts of $SbCl_5$ and about 40 parts of $SbCl_3$ in the reaction vessel and then passing HF through the mixture until the fluorine content therein is about 1% to about 7%. The reaction mixture is passed from the reaction vessel through the reflux column 12 and dephlegmator 14, operated to retain $CHCl_3$ and $CHCl_2F$ for maximum conversion to $CHClF_2$. The reaction products then pass to the catch tank 16 wherein they are freed from entrained catalyst such as antimony salts. The gaseous reaction mixture is compressed into the middle of the reflux column 20, employing a pump or compressor where necessary. The mixture, entering the reflux column 20, is either gaseous or partially liquid and partially gaseous, depending upon the temperature and pressure.

The reflux column 20 and the dephlegmator 22 are operated at temperatures, corresponding to the pressure employed, to distill off substantially pure anhydrous HCl together with any $CHF_3$ which may be present which are taken off at the top. The $CHF_3$ will ordinarily be less than 0.5 mol per cent of the HCl. With pressures of about 100 pounds per square inch gauge, the dephlegmator temperature will be from about —40° C. to about —50° C. I have found these last temperatures and pressures to be the most practical, but higher or lower pressures may be used with the temperatures adjusted accordingly. The still pot 18 will be heated to give a pot temperature of about 15° C. to about 30° C., depending upon the proportion of $CHCl_2F$ in the mixture, the higher temperatures being employed with higher proportions of $CHCl_2F$.

The other components of the reaction mixture will pass to and be collected in the still pot 18. The residue in the still pot will be forced, by autogenous pressure, into the reflux column 26. There will be a slight pressure drop so that the reflux column 26 will normally operate at slightly lower pressures than the reflux column 20, e. g., at from about 35 to about 70 pounds per square inch gauge. If desired, a compressor or other means can be included to increase the pressure in the reflux column 26, but this will generally be unnecessary. Preferably, the pressure in the reflux column 26 and the dephlegmator 28 will be about 50 pounds per square inch gauge. At these pressures, the temperature in the dephlegmator will be about —5° C. to about 0° C. By this means, there is obtained a substantially complete separation of the $CHClF_2$ and about 60% of the HF from the rest of the reaction mixture. The distillate is an azeotrope and contains from about 1% to about 2.2% by weight of HF. The distillate mixture of $CHClF_2$ and HF will be passed directly to a scrubber wherein the HF can be removed from the $CHClF_2$ by washing with a small amount of water.

The mixture in the still pot 24 may be recycled to the reaction vessel 10 but, preferably, will be passed to the settling tank 30. Upon settling, there is formed an HF layer and an organic layer. The HF layer consists of substantially anhydrous HF and a minor proportion of $CHCl_2F$ dissolved therein. The amount of $CHCl_2F$ dissolved in the HF will depend on the temperature, varying from about 14% by weight at —30° C. to about 26% by weight at +20° C. The organic layer consists essentially of $CHCl_2F$ and CHCl, having dissolved therein a small proportion of HF. The amount of HF dissolved in the organic layer will also depend on the temperature, the solubility of HF in $CHCl_2F$ varying from about 0.6% by weight at —30° C. to about 2.2% by weight at +20° C. In practice, the amount of HF dissolved in the organic layer will usually be less than this, depending on the amount of $CHCl_3$ present.

The HF layer will be withdrawn from tank 30 and passed to the reaction vessel 10 or to storage. The lower organic layer in the tank 30, comprising $CHCl_2F$, unreacted $CHCl_3$, and dissolved HF, may be returned to the reaction vessel 10 for further fluorination. Preferably, however, the organic layer will be withdrawn from tank 30 and passed to reflux column 36. The reflux column 36 and dephlegmator 40 will be operated at pressures of from about 30 to about 65 pounds per square inch gauge. The temperature of the vapors in the dephlegmator 40 will be from about 41° C. to about 63° C., adjusted to the pressures to distill off $CHCl_2F$ and HF and to retain $CHCl_3$, which is passed to the still pot 38 and then recycled to the reaction vessel 10 for fluorination.

The residues in the still pots 18, 24 and 38 will preferably be allowed to build up until the pots are about half full and the residues will be drawn off therefrom as necessary to maintain the pots about half full. If all of the still residue were removed from each pot, the stills would tend to operate erratically. By maintaining each still pot about half full of residue, smoother and better still performance is obtained.

In order to illustrate my invention, the following example is given:

*Example*

A mixture consisting essentially of 400 parts of $SbCl_5$, 20 parts of $SbCl_3$, and 500 parts of $CHCl_3$ is placed in reactor 10. While the mixture is maintained at about 70±5° C., and 120 p. s. i. g., 50 parts of HF and 140 parts of $CHCl_3$ per hour are added simultaneously into the reactor. During the operation, the reflux temperature in the dephlegmator is not allowed to rise above 20° C. at 120 p. s. i. g. This pressure is substantially equal to the vapor pressure of $CHClF_2$ at the temperature 20° C. If the autoclave and column are operated at pressures greater than this, correspondingly higher dephlegmator temperatures can be maintained.

The product gases from the top of the dephlegmator are conducted through a brine-cooled catch tank, cooled sufficiently to collect practically all of the CHCl₃ along with any entrained catalyst. This trapped material is continuously returned to the reactor. The gases from the catch tank are then conducted into the HCl still column where it is continuously fractionated to remove the HCl and any CHF₃ from the other products. The dephlegmator of this HCl distillation unit is maintained under pressure-temperature conditions which will reflux anhydrous HCl and the small amount of CHF₃ produced. These conditions correspond closely to 100 p. s. i. g. at the temperature of $-40°$ C. The HCl still pot is heated to give a pot temperature of about 25° C. The reaction products, remaining at the bottom of the HCl still, consist essentially of CHCl₂F, CHClF₂, HF, and traces of chloroform. A standpipe in the pot connects it with the CHClF₂ still column. The controls are so arranged that, when the HCl still pot becomes half full, a valve in the line to the CHClF₂ column is opened and the CHClF₂ and other high boilers are forced, by the pressure of the HCl still, into the CHClF₂ still which is operated at a lower pressure (50 p. s. i. g.). This valve is throttled so as to maintain a steady flow into the CHClF₂ still. The CHClF₂ column is operated to maintain the temperature and pressure in the dephlegmator equivalent to the saturation values for CHClF₂. In this case, this is a pressure of 50 p. s. i. g. at the dephlegmator temperature of $-5$ to $0°$ C. From the CHClF₂ still dephlegmator, the desired fluorinated compound CHClF₂ and the HF which comes off with it are sent to the water scrubber, then through dryers and compressed. This material is of sufficient purity to be of refrigerant grade. The CHClF₂ still pot is similarly equipped with a standpipe, like that in the HCl still pot, for the removal of CHCl₂F, CHCl₃, and HF collecting in the pot. From this pot, the mixture can be fed either into the catalyst pot or it can be passed into the brine-cooled organic-HF separator. In this separator, the HF layer is the top layer and the organic layer can be drawn off the bottom and separated by distillation or fed directly back into the reactor.

The apparatus and the operation thereof, as hereinbefore described, illustrates one type of apparatus for a continuous process. Other types of apparatus may be substituted therefor. Also, the process may be operated batchwise in suitable apparatus therefor. Furthermore, pressures, higher and lower than those disclosed, may be employed with suitable adjustment of the temperatures in accordance with the principles of my invention. Therefore, my invention is not to be limited to the specific embodiments disclosed, but I intend to cover my invention broadly as in the appended claims.

This is a continuation-in-part of my co-pending application Serial No. 577,869, filed February 14, 1945, now abandoned.

I claim:

1. The process of separating valuable components from a reaction mixture comprising HCl, HF, CHClF₂ and CHCl₂F, of the character of that obtained by the reaction of HF on CHCl₃, which comprises the steps of subjecting the reaction mixture to anhydrous fractional distillation under pressures of from about 40 to about 200 pounds per square inch gauge and at temperatures of from about $-63°$ C. to about $-20°$ C., adjusted to the pressures to distill off the HCl as substantially pure anhydrous hydrogen chloride, then subjecting the remaining mixture to a further anhydrous fractional distillation under pressures of from about 0 to about 100 pounds per square inch gauge and at temperatures of from about $-43°$ C. to about 20° C., adjusted to the pressures to distill off a mixture comprising substantially the monochlorodifluoromethane and part of the hydrogen fluoride, settling the undistilled mixture until it forms a layer of substantially anhydrous hydrogen fluoride containing a minor proportion of dissolved dichloromonofluoromethane and a layer comprising dichloromonofluoromethane, and separating the layers.

2. The process of separating valuable components from a reaction mixture comprising HCl, HF, CHClF₂ and CHCl₂F, of the character of that obtained by the reaction of HF on CHCl₃, which comprises the steps of subjecting the reaction mixture to anhydrous fractional distillation under pressures of about 100 pounds per square inch gauge and at about $-50°$ C. to about $-40°$ C. to distill off the HCl as substantially pure anhydrous hydrogen chloride, then subjecting the remaining mixture to a further anhydrous fractional distillation under pressures of about 50 pounds per square inch gauge and at about $-5°$ C. to about 0° C. to distill off a mixture comprising substantially the monochlorodifluoromethane and part of the hydrogen fluoride, settling the undistilled mixture until it forms a layer of substantially anhydrous hydrogen fluoride containing a minor proportion of dissolved dichloromonofluoromethane and a layer comprising dichloromonofluoromethane and separating the layers.

3. The process of separating valuable components from a reaction mixture comprising HCl, HF, CHClF₂ and CHCl₂F, of the character of that obtained by the reaction of HF on CHCl₃, which comprises the steps of subjecting the reaction mixture to anhydrous fractional distillation under pressures of from about 40 to about 200 pounds per square inch gauge and at temperatures of from about $-63°$ C. to about $-20°$ C., adjusted to the pressures to distill off the HCl as substantially pure anhydrous hydrogen chloride, then subjecting the remaining mixture to a further anhydrous fractional distillation under pressures of from about 0 to about 100 pounds per square inch gauge and at temperatures of from about $-43°$ C. to about 20° C., adjusted to the pressures to distill off a mixture comprising substantially the monochlorodifluoromethane and part of the hydrogen fluoride.

4. The process of separating valuable components from a reaction mixture comprising HCl, HF, CHClF₂ and CHCl₂F, of the character of that obtained by the reaction of HF on CHCl₃, which comprises the steps of subjecting the reaction mixture to anhydrous fractional distillation under pressures of about 100 pounds per square inch gauge and at about $-50°$ C. to about $-40°$ C. to distill off the HCl as substantially pure anhydrous hydrogen chloride, then subjecting the remaining mixture to a further anhydrous fractional distillation under pressures of about 50 pounds per square inch gauge and at about $-5°$ C. to about 0° C. to distill off a mixture comprising substantially the monochlorodifluoromethane and part of the hydrogen fluoride.

5. The process of separating valuable components from a reaction mixture comprising HCl, HF, CHClF$_2$, CHCl$_2$F and CHCl$_3$, of the character of that obtained by the reaction of HF on CHCl$_3$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl as substantially pure anhydrous hydrogen chloride, then subjecting the remaining mixture to a further anhydrous fractional distillation under pressures of from about 0 to about 100 pounds per square inch gauge and at temperatures of from about −43° C. to about 20° C., adjusted to the pressures to distill off a mixture comprising substantially the monochlorodifluoromethane and about 60% of the hydrogen fluoride, settling the undistilled mixture until it forms a layer of substantially anhydrous hydrogen fluoride containing a minor proportion of dissolved dichloromonofluoromethane and a layer of a mixture of dichloromonofluoromethane and chloroform containing a small proportion of dissolved HF, separating the layers, and then subjecting the mixture of dichloromonofluoromethane, chloroform and dissolved HF to an anhydrous fractional distillation to separate the dichloromonofluoromethane and HF from the chloroform.

6. The process of separating valuable components from a reaction mixture comprising HCl, HF, CHClF$_2$, CHCl$_2$F and CHCl$_3$, of the character of that obtained by the reaction of HF on CHCl$_3$, which comprises the steps of subjecting the reaction mixture to anhydrous fractional distillation under pressures of about 100 pounds per square inch gauge and at about −50° C. to about −40° C. to distill off the HCl as substantially pure anhydrous hydrogen chloride, then subjecting the remaining mixture to a further anhydrous fractional distillation under pressures of about 50 pounds per square inch gauge and at about −5° C. to about 0° C. to distill off a mixture comprising substantially the monochlorodifluoromethane and about 60% of the hydrogen fluoride, separating the HF from the monochlorodifluoromethane, settling the undistilled mixture until it forms a layer of substantially anhydrous hydrogen fluoride containing a minor proportion of dissolved dichloromonofluoromethane and a layer of a mixture of dichloromonofluoromethane and chloroform containing a small proportion of dissolved HF, separating the layers, and then subjecting the mixture of dichloromonofluoromethane, chloroform and dissolved HF to an anhydrous fractional distillation to separate the dichloromonofluoromethane and HF from the chloroform.

ANTHONY F. BENNING.

No references cited.